(12) United States Patent
Braun et al.

(10) Patent No.: US 6,762,745 B1
(45) Date of Patent: Jul. 13, 2004

(54) ACTUATOR CONTROL PROVIDING LINEAR AND CONTINUOUS FORCE OUTPUT

(75) Inventors: Adam C. Braun, Sunnyvale, CA (US); Kollin M. Tierling, Campbell, CA (US); Bruce M. Schena, Menlo Park, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/565,788

(22) Filed: May 5, 2000

Related U.S. Application Data

(60) Provisional application No. 60/133,370, filed on May 10, 1999.

(51) Int. Cl.[7] .................................................. G09G 5/00
(52) U.S. Cl. .................. 345/156; 318/568.11; 318/590
(58) Field of Search ................................. 345/156, 157, 345/161, 163, 184, 173; 200/5 R, 6 R, 176, 177; 318/568.11, 590

(56) References Cited

U.S. PATENT DOCUMENTS

| | | |
|---|---|---|
| 2,832,073 A | 4/1958 | Arkus et al. |
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,902,687 A | 6/1973 | Hightower |
| 3,903,614 A | 9/1975 | Diamond et al. |
| 3,919,691 A | 11/1975 | Noll .......................... 340/172.5 |

(List continued on next page.)

FOREIGN PATENT DOCUMENTS

| | | |
|---|---|---|
| EP | 0081374 | 6/1983 |
| EP | 0085518 A1 | 8/1983 |
| EP | 0349086 | 1/1990 |
| GB | 2347199 | 8/2000 |
| JP | H2-185278 | 7/1990 |
| JP | H4-8381 | 1/1992 |
| JP | H5-192449 | 8/1993 |
| JP | H7-24147 | 1/1995 |
| WO | WO98/24180 | 6/1998 |
| WO | WO98/33136 | 7/1998 |

OTHER PUBLICATIONS

Batter, et al., "Grope–1: A Computer Display to the Sense of Feel", University of North Carolina at Chapel Hill, Chapel Hill, North Carolina, USA.

Minsky, et al., "Feeling and Seeing: Issues in Force Display", Department of Computer Science, University of North Carolina at Chapel Hill, Chapel Hill, NC 27599, 1990 ACM.

(List continued on next page.)

*Primary Examiner*—Bipin Shalwala
*Assistant Examiner*—Mansour M. Said
(74) *Attorney, Agent, or Firm*—Kilpatrick Stockton LLP

(57) ABSTRACT

Methods and apparatus for controlling an actuator to provide linear and continuous force output to a user of a force feedback device. To provide continuous and smooth force output in a zero crossover region of operation, two drive signals are used, each causing current to flow in a different direction in the actuator. When a desired output force is in the crossover region, the two drive signals are alternated to cause the output force to quickly switch directions. When the desired force is outside the crossover region, only one drive signal is used to cause output force in one direction. To compensate for a nonlinear output of the actuator, a desired command current is correlated with an approximated point of a characterization curve of the actuator, where the curve includes points determined in a previously performed actuator characterization. The approximated point is determined between two successive points using a linear approximation, and a drive signal duty cycle is determined from the approximated point. Other features can be implemented to compensate for power supply voltage variation, back EMF effect, and temperature.

38 Claims, 7 Drawing Sheets

U.S. PATENT DOCUMENTS

| | | |
|---|---|---|
| 3,923,166 A | 12/1975 | Fletcher et al. .................. 214/1 |
| 4,125,800 A | 11/1978 | Jones .......................... 318/681 |
| 4,160,508 A | 7/1979 | Salsbury |
| 4,236,325 A | 12/1980 | Hall et al. |
| 4,382,217 A | 5/1983 | Horner et al. ............... 318/778 |
| 4,398,889 A | 8/1983 | Lam et al. .................... 434/45 |
| 4,477,043 A | 10/1984 | Repperger .................. 244/223 |
| 4,513,235 A | 4/1985 | Acklam et al. |
| 4,581,491 A | 4/1986 | Boothroyd |
| 4,599,070 A | 7/1986 | Hladky et al. |
| 4,632,341 A | 12/1986 | Repperger et al. .......... 244/230 |
| 4,708,656 A | 11/1987 | de Vries et al. |
| 4,713,007 A | 12/1987 | Alban |
| 4,758,692 A | 7/1988 | Roeser et al. ................... 200/6 |
| 4,800,721 A | 1/1989 | Cemenska et al. ............ 60/393 |
| 4,825,157 A | 4/1989 | Mikan ........................ 324/208 |
| 4,891,764 A | 1/1990 | McIntosh |
| 4,930,770 A | 6/1990 | Baker |
| 4,933,584 A | 6/1990 | Harms et al. ............... 310/162 |
| 4,934,694 A | 6/1990 | McIntosh |
| 4,949,119 A | 8/1990 | Moncrief et al. ........... 364/578 |
| 4,961,038 A | 10/1990 | MacMinn ................... 318/696 |
| 5,019,761 A | 5/1991 | Kraft |
| 5,022,407 A | 6/1991 | Horch et al. |
| 5,035,242 A | 7/1991 | Franklin |
| 5,038,089 A | 8/1991 | Szakaly |
| 5,044,956 A | 9/1991 | Behensky et al. ............ 434/45 |
| 5,076,517 A | 12/1991 | Ferranti et al. ............. 244/228 |
| 5,078,152 A | 1/1992 | Bond |
| 5,103,404 A | 4/1992 | McIntosh ............... 318/568.22 |
| 5,142,931 A | 9/1992 | Menahem .............. 74/471 XY |
| 5,146,566 A | 9/1992 | Hollis, Jr. ................... 395/275 |
| 5,184,319 A | 2/1993 | Kramer ...................... 364/806 |
| 5,185,561 A | 2/1993 | Good et al. ................. 318/432 |
| 5,186,685 A | 2/1993 | Mangseth et al. |
| 5,193,963 A | 3/1993 | McAffee et al. ............... 414/5 |
| 5,194,786 A | 3/1993 | Smith et al. ................ 318/254 |
| 5,212,473 A | 5/1993 | Louis |
| 5,223,776 A | 6/1993 | Radke et al. ............... 318/568 |
| 5,240,417 A | 8/1993 | Smithson et al. |
| 5,264,768 A | 11/1993 | Gregory et al. ............. 318/561 |
| 5,271,290 A | 12/1993 | Fischer |
| 5,275,174 A | 1/1994 | Cook |
| 5,276,621 A | 1/1994 | Henry et al. ........... 364/424.05 |
| 5,299,810 A | 4/1994 | Pierce |
| 5,309,140 A | 5/1994 | Everett |
| 5,327,790 A | 7/1994 | Levin et al. ........... 73/862.325 |
| 5,334,027 A | 8/1994 | Wherlock |
| 5,466,213 A | 11/1995 | Hogan |
| 5,513,100 A | 4/1996 | Parker et al. .......... 364/167.01 |
| 5,547,382 A | 8/1996 | Yamasaki |
| 5,576,727 A | 11/1996 | Rosenberg et al. ......... 345/179 |
| 5,589,854 A | 12/1996 | Tsai ........................... 345/161 |
| 5,625,576 A | 4/1997 | Massie et al. ............... 364/578 |
| 5,629,594 A | 5/1997 | Jacobus et al. ........ 318/568.11 |
| 5,643,087 A | 7/1997 | Marcus et al. ................ 463/38 |
| 5,656,901 A | 8/1997 | Kurita ........................ 318/436 |
| 5,666,138 A | 9/1997 | Culver ....................... 345/161 |
| 5,687,080 A | 11/1997 | Hoyt et al. ................. 364/190 |
| 5,691,898 A | 11/1997 | Rosenberg et al. ......... 364/190 |
| 5,694,013 A | 12/1997 | Stewart et al. .............. 318/561 |
| 5,709,219 A | 1/1998 | Chen et al. .................. 128/782 |
| 5,734,373 A | * 3/1998 | Rosenberg et al. ......... 345/161 |
| 5,739,811 A | 4/1998 | Rosenberg et al. ......... 345/161 |
| 5,742,278 A | 4/1998 | Chen .......................... 345/156 |
| 5,766,016 A | 6/1998 | Sinclair |
| 5,785,630 A | 7/1998 | Bobick et al. |
| 5,790,108 A | 8/1998 | Salcudean et al. .......... 345/184 |
| 5,802,353 A | 9/1998 | Avila et al. ................. 395/500 |
| 5,805,140 A | 9/1998 | Rosenberg et al. ......... 345/161 |
| 5,825,808 A | 10/1998 | Rosenberg .................... 341/20 |
| 5,889,670 A | 3/1999 | Schuler et al. .............. 364/186 |
| 5,907,487 A | * 5/1999 | Rosenberg et al. ........... 700/85 |
| 5,959,613 A | 9/1999 | Rosenberg et al. ......... 345/161 |
| 5,990,869 A | 11/1999 | Kubica et al. .............. 345/163 |
| 5,999,168 A | 12/1999 | Rosenberg et al. ......... 345/161 |
| 6,001,014 A | 12/1999 | Ogata et al. .................. 463/37 |
| 6,004,134 A | 12/1999 | Marcus et al. ................ 434/45 |
| 6,020,875 A | 2/2000 | Moore et al. ............... 345/156 |
| 6,020,876 A | 2/2000 | Rosenberg et al. ......... 345/157 |
| 6,050,718 A | 4/2000 | Schena et al. .............. 364/190 |
| 6,100,874 A | 8/2000 | Schena et al. .............. 345/157 |
| 6,104,382 A | 8/2000 | Martin et al. ............... 345/161 |
| 6,111,577 A | 8/2000 | Zilles et al. |
| 6,154,201 A | 11/2000 | Levin et al. ................. 345/184 |
| 6,191,796 B1 | * 2/2001 | Tarr ........................... 345/581 |
| 6,219,033 B1 | * 4/2001 | Rosenberg et al. ......... 345/157 |
| 6,219,034 B1 | 4/2001 | Elbing et al. |
| 6,336,364 B1 | * 1/2002 | Parker et al. .................. 73/462 |
| 6,348,911 B1 | * 2/2002 | Rosenberg et al. ......... 345/161 |
| 6,422,941 B1 | 7/2002 | Thorner et al. |

OTHER PUBLICATIONS

Russo, "The Design and Implementation of a Three Degree–of–Frredom Force Output Joystick", Submitted to the Department of Mechanical Engineering on May 11, 1990.

Ouh–Young, Ming, "Force Display in Molecular Docking," Chapel Hill 1990.

Adelstein Bernard D. et al., "A High Performance Two Degree–of–Freedom Kinesthetic Interface," Massachusetts Institute of Technology 1992, pp. 108–112.

Hannaford, B. et al., "Performance Evaluation of a Six–Axis Generalized Force–Reflecting Teleoperator," IEEE Transactions on Systems, Man, and Cybernetics, 1991.

Fischer, P. et al., "Specification and Design of Input Devices for Teleoperation", IEEE Conference on Robotics and Automation, IEEE, 1990, pp. 540–545.

Colgate, J. et al., "Implementation of Stiff Virtual Walls in Force–Reflecting Interfaces," Sep. 22, 1993.

Rosenberg, L., "Virtual Haptic Overlays Enhance Performance in Telepresence Tasks", SPIE 1994.

Hasser, C., "Tactile Feedback for a Force–Reflecting Haptic Display", Univ. of Dayton, Dayton OH, 1995, pp. 1–96.

Kelley, A.J. et al., "MagicMouse: Tactile and Kinesthetic Feedback in the Human–Computer Interface using an Electromagnetically Actuated Input/Output Device," Dept. of Elec. Engineering, Univ. of British Columbia, 1993, pp. 1–27.

Baigrie, Stephen A., Reflectone Inc., "Electric Control Loading—A Low Cost, High Performance Alternative," American Defense Preparedness Association $12^{th}$ Interservice/Industry Training System Conference, Nov. 6–8, 1990.

Rutherford, M. "Third Generation Digital Flight Controls, " CAE Electronics, Ltd., The Royal Aeronautical Society, 1984 Spring Convention Future Applications and Prospects for Flight Simulation, 1984, paper No. 15.

Millman, P. et al., "Design of a Four Degree–of–Freedom Force–Reflecting Manipulandum with a Specific Force/Torque Workspace,"IEEE CH2969–4, 1991, pp. 1488–1492.

Kilpatrick, P., "The Use of a Kinesthetic Supplement in an Interactive Graphics System," Univ. of N. Carolina, 1976, pp. 1–175.

Schmult, Brian et al., "Application Areas for a Force–Feedback Joystick," ASME 1993, DSC–vol. 49, pp. 47–54.

Brooks, F. et al., "Project GROPE—Haptic Displays for Scientific Visualization," Computer Graphics, vol. 24, No. 4, 1990, pp. 177–185.

Ellis, R.E. et al., "Design and Evaluation of a High–Performance Prototype Planar Haptic Interface," ASME Dec. 3, 1993, DSC–vol. 49, pp. 55–64.

Winey III, C., "Computer Simulated Visual and Tactile Feedback as an Aid to Manipulator and Vehicle Control," Mass. Instiute of Tech., Mech. Engineering, 1981, pp. 1–79.

Howe, Robert D., "Task Performance with a Dextrous Teleoperated Hand System," Proceedings of SPIE, Nov. 1992, vol. 1833, pp. 1–9.

Gotow, J.K., et al., "Perception of Mechanical Properties at the Man–Machine Interface," IEEE CH2503–1, 1987, pp. 688–689.

Hannaford, et al., "Scaling of Direct Drive Robot Arms," Int'l Journal of Robotics Research, 15:5, Jun. 1996, pp. 1–47.

Buttolo, et al., "Hard Disk Actuators for Mini Teleoperation, "Proc. SPIE, Telemanipulator and Telepresence Technologies Symp., Oct. 1994, pp. 1–8.

Adelstein, Bernard D. et al., "Design and Implementation of a Force Reflecting Manipulandum for Manual Control Research," Dept. of Mech. Eng., MIT, 1992, pp. 1–24.

"Taking a Joystick Ride", Computer Currents, Tim Scannell, Nov. 1994, Boston Edition, vol. 9 No. 11.

"Coaxial Control Shaker Part No. C–25502," Safe Flight Instrument Corporation, 26 pages, Jul. 1, 1967; Revised Jan. 28, 2002.

Baigrie, "Electric Control Loading–A Low Cost, High Performance Alternative," Proceedings, pp. 247–254, Nov. 6–8, 1990.

Iwata, "Pen–based Haptic Virtual Environment," 0–7803–1363–1/93 IEEE, pp. 287–292, 1993.

Russo, "The Design and Implementation of a Three Degree of Freedom Force Output Joystick," MIT Libraries Archives Aug. 14, 1990, pp. 1–131, May 1990.

Brooks et al., "Hand Controllers for Teleoperation –A State–of–the–Art Technology Survey and Evaluation," JPL Publication 85–11; NASA–CR–175890; N85–28559, pp. 1–84, Mar. 1, 1985.

Jones et al., "A perceptual analysis of stiffness," ISSN 0014–4819 Springer International (Springer–Vertag); Experimental Brain Research, vol. 79, No. 1, pp. 150–156, 1990.

Burdea et al., "Distributed Virtual Force Feedback, Lecture Notes for Workshop on Force Display in Virtual Environments and its Application to Robotic Teleoperation," IEEE International Conference on Robotics and Automation, pp. 25–44, May 2, 1993.

Snow et al., "Model–X Force–Reflecting–Hand–Controller," NT Control No. MPO–17851; JPL Case No. 5348, pp. 1–4, Jun. 15, 1989.

Ouh–Young, "Force Display in Molecular Docking," Order No. 9034744, p.1–369, 1990.

Tadros, Control System Design for a Three Degree of Freedom Virtual Environment Simulator Using Motor/Brake Pair Actuators, MIT Archive© Massachusetts Institute of Technology, pp. 1–88, Feb. 1990.

Caldwell et al., "Enhanced Tactile Feedback (Tele–Traction) Using a Multi–Functional Sensory System, "1050–4729/93, pp. 955–960, 1993.

Adelstein, "Design and Implementation of a Force Reflecting Manipulandum for Manual Control research," DSC–vol. 42, Advances in Robotics, Edited by H. Kazerooni, pp. 1–12, 1992.

Gotow et al, "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSV–vol. 42, Advances in Robotics, pp. 55–61, ASME 1992.

Russo, "Controlling Dissipative Magnetic Particle Brakes in Force Reflective Devices, "DSC–vol. 42, Advances in Robotics, pp. 63–70, ASME 1992.

Kontarinis et al., "Display of High–Frequency Tactile Information to Teleperators," Telemanipulator Technology anf Space Telerobotics, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," Cooperative Intelligent Robotics in Space, Rui J. deFigueiredo et al., Editor, Proc. SPIE vol. 1387, pp. 215–222, 1990.

Adelstein, "A Virtual Environment System For The Study of Human Arm Tremor," Ph.D. Dissertation, Dept. of Mechanical Engineering, MIT, Jun. 1989.

Bejczy, "Sensors, Control, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings Of Fourth CISM–IFToMM, Sep. 8–12, 1981.

McAffee, "Teleoperator Subsystem/Telerobot Demonsdtrator: Force Reflecting Hand Controller Equipment Manual," JPL D–5172, pp. 1–50, A1–A36, B1–B5, C1–C36, Jan. 1988.

Minsky, "Computauinal Haptics: The Sandpaper System for Synthesizing Textue for a Force–Feedback Display," Ph.D. Dissertation, MIT, Jun. 1995.

Jacobsen et al., "High Performance, Dextrous Telerobotic Manipulator With Force Reflection,"Intervention/ROV '91 Conference & Exposition, Hollywood, Florida, May 21–23, 1991.

Shimoga, "Finger Force and Touch Feedback Issues in Dexterous Telemanipulation," Proceedings of Fourth Annual Conferance on Intelligent Robotic Systems for Space Exploration, Rensselaer Polytechnic Institute, Sep. 30–Oct. 1, 1992.

IBM Technical Sicslosure Bullein, "Mouse Ball–Actuating Device With Force and Tactile Feedback," vol. 32, No. 9B, Feb. 1990.

Terry et al., "Tactile Feedback In A Computer Mouse," Proceedings of Fourteenth Annual Northeast Bioengineering Conference, University of New Hampshire, Mar. 10–11, 1988.

Howe, "A Force–Reflecting Teleoperated Hand System for the Study of Tactile Sensing in Precision Manipulation," Proceedings of the 1992 IEEE International Conference on Robotics and Automation, Nice, France, May 1992.

Eberhardt et al., "OMAR–A Haptic display for speech perception deaf anf def–blind individuals," IEEE Virtual Reality Annual International Symposium, Seattle, WA, Sep. 18–22, 1993.

Rabinowitz et al., "Multidimensional tactile displays: Idenification of vibratory intensity, frequency, and contractor area," Journal of The Accoustical Society of America, vol. 82, No. 4, Oct. 1987.

Bejczy et al., "Kinesthetic Coupling Between Operator and Remote Manipulator,"Inernational Computer Technology Conference, The American Society of Mechanical Engineers, San Francisco, CA, Aug. 12–15, 1980.

Bejczy et al., "A Laboratory Breadboard System For Dual–Arm Teleoperation,"SOAR '89 Workshop, JSC, Houston, TX, Jul. 25–27, 1989.

Ouh–Young, "A Low–Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8–11, 1994.

Bejczy, et al., "Universal Computer Control System (UCCS) For Space Telerobots," CH2413–3/87/0000/0318501.00 1987 1EEE, 1987.

Aukstakalnis et al., "Silicon Mirage: The Art and Science of Virtual Reality," ISBN 0–938151–82–7, pp. 129–180, 1992.

Eberhardt et al., "Including Dynamic Haptic Perception by The Hand: System Description and Some Results," DSC–vol. 55–1, Dynamic Systems and Control: vol 1, ASME 1994.

Gobel et al., "Tactile Feedback Applied to Computer Mice," International Journal of Human–Computer Interaction, vol. 7, No. 1, pp. 1–24, 1995.

Pimental et al., "Virtual Reality: through the new looking glass," $2^{nd}$ Edition; McGraw–Hill, ISBN 0–07–050167–X, pp. 41–202, 1994.

"Cyberman Technical Specification," Logitech Cyberman SWIFT Supplement, Apr. 5, 1994.

Ouhyoung et al., "The Development of A Low–Cost Force Feedback Joystick and Its Use in the Virtually Reality Environment," Proceedings of the Third Pacific Conference on Computer Graphics and Applications, Pacific Graphics '95, Seoul, Korea, 21–24 Aug. 1995.

Kaczmarek et al., "Tactile Displays," Virtual Environment Technologies.

* cited by examiner

ACTUATOR CONTROL PROVIDING LINEAR AND CONTINUOUS FORCE OUTPUT

CROSS REFERENCE TO RELATED APPLICATIONS

This application claims priority to U.S. Provisional Application No. 60/133,370, filed May 10, 1999 by Braun et al., which is incorporated herein by reference in its entirety.

BACKGROUND OF THE INVENTION

The present invention relates generally to actuator control techniques, and more particularly to the control of force sensations output by actuators in a force feedback interface device.

Using an interface device, a user can interact with an environment displayed by a computer system to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, steering wheel, stylus, tablet, pressure-sensitive ball, or the like, that is connected to the computer system controlling the displayed environment.

In some interface devices, haptic feedback or tactile feedback is also provided to the user, generally referred to as "force feedback" herein. These types of interface devices can provide physical sensations which are felt by the user manipulating the physical object of the interface device. For example, the Wingman Force joystick or Wingman Force mouse from Logitech may be connected to a computer and provides forces to a user of the controller. One or more motors or other actuators are used in the device and are connected to the controlling computer system. The computer system controls forces on the manipulandum of the force feedback device and/or on the housing of the device in conjunction and coordinated with displayed events and interactions on the host by sending control signals or commands to the force feedback device and the actuators.

In force feedback devices, it is important to have accurate control over the force output of the actuators on the device so that desired force sensations are accurately conveyed to the user. Typically, actuators are controlled by controlling the current through the actuator, such as a brushed DC motor or a voice coil actuator. To a first approximation, the torque output of the actuator is directly proportional to the actuator current. However, there are several different characteristics that make controlling current through the actuator difficult. These characteristics include the temperature variation of the coil in the actuator, back EMF (electromotive force) from user motion of the manipulandum of the device, power supply voltage variation, and variable coil impedance (which varies with temperature and current). The nonlinear force output response of actuators in relation to command signal level or duty cycle can cause problems in providing desired force magnitudes and sensations in force feedback applications, since the force magnitude that is commanded to the actuator may not necessarily be the force magnitude that is actually output by the actuator to the user.

In addition to these problems, there are some issues related to using a switch mode motor amplifier. The most significant of these issues for a force feedback system is related to the zero crossover point, i.e. the point where the current and actuator output force changes direction. The basic problem is that as the command to the actuator is modified from positive to negative (or negative to positive), there is a discontinuity as the force command passes through the zero point or near the zero point. This discontinuity in actuator current results in discontinuity in force output and is often quite perceptible to the user, leading to disruptions in the fidelity of the output force sensations in force feedback applications.

SUMMARY OF THE INVENTION

The present invention provides a method and apparatus for controlling an actuator to provide linear and continuous force output to a user of a force feedback device. The control features described herein allow discontinuities at zero-force crossover regions to be minimized while providing strong forces at the high ends of the force range and reduce the nonlinear force output produced by many actuators in relation to the input command signal to the actuator.

More particularly, a method for commanding a desired force from an actuator provided in a force feedback device includes providing two drive signals, each of the drive signals causing current to flow in a different direction in the actuator, thereby causing force to be output by the actuator in two different corresponding directions. When a desired force to be output is below a predetermined threshold force in a crossover region, the two drive signals are alternated for each period of the drive signals to cause a corresponding current in the actuator, thereby switching the direction of the desired force for each of the periods. When the desired force is above the predetermined threshold force, only one of said drive signals is used to cause current in the actuator in one direction and cause the desired force to be output in one direction.

The drive signals are preferably PWM drive signals and a select signal is preferably provided to select between using the two PWM drive signals and using only one of the PWM drive signals. Each of the PWM drive signals can control two switches in an actuator bridge circuit that provides current to the actuator. The select signal can be provided by a selection circuit including a flip flop and a parallel resistor, where the flip flop selects the PWM signal configurations. A circuit of the present invention for commanding a desired force from an actuator provided in a force feedback device includes a selection circuit and a bridge circuit performing similar functionality.

A method of the present invention for controlling an actuator to compensate for a nonlinear output of said actuator includes determining a desired command current for an actuator, where the command current causes a desired output force to be output by the actuator. The desired command current is correlated with an approximated point of a characterization curve of the actuator, where the characterization curve includes multiple points determined in a previously performed characterization of the actuator. The approximated point is determined between two successive points of the multiple points using a linear approximation, and a required command duty cycle is determined from the approximated point of the characterization curve. A drive signal having the determined command duty cycle is applied to the actuator to cause the actuator to output the desired force.

The multiple points of the characterization curve are stored in a look-up table, and preferably at least three points are stored to provide at least two linear sections of the characterization curve. The crossover region can also be implemented with the linearization method, so that alternating first and second drive signals are output to drive the actuator when the desired output force is between zero and a threshold force, where a linearly-approximated duty cycle is obtained for both of the drive signals.

Other features of the present invention can be implemented to provide a more linear force output. For example, voltage variations supplied to the actuator from a power supply can be compensated for such that the actuator output is linear regardless of the variations. A change in actuator current can be predicted that is caused by a back EMF effect induced by motion of a manipulandum of the force feedback device by the user. The predicted change in motor current can be based on a determined manipulandum velocity, and the drive signal to the actuator can then be compensated in accordance with the predicted change in current. Finally, the drive signal can be adjusted based on temperature information indicating a change in temperature of the wire coils of the actuator to compensate for a change in current in the actuator caused by temperature variation in the coil winding and to cause the desired force to be output.

The present invention provides methods and apparatus that control the actuator output in a force feedback device to allow a more linear and continuous output. The discontinuous current and output force occurring over a zero crossing of output force is minimized with the dual region control of the present invention. The nonlinear output of actuators is minimized using open loop precharacterization and linear approximation of actuator output and other techniques. These features allow the actuator in a force feedback device to provide force sensations with greater fidelity and realism.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
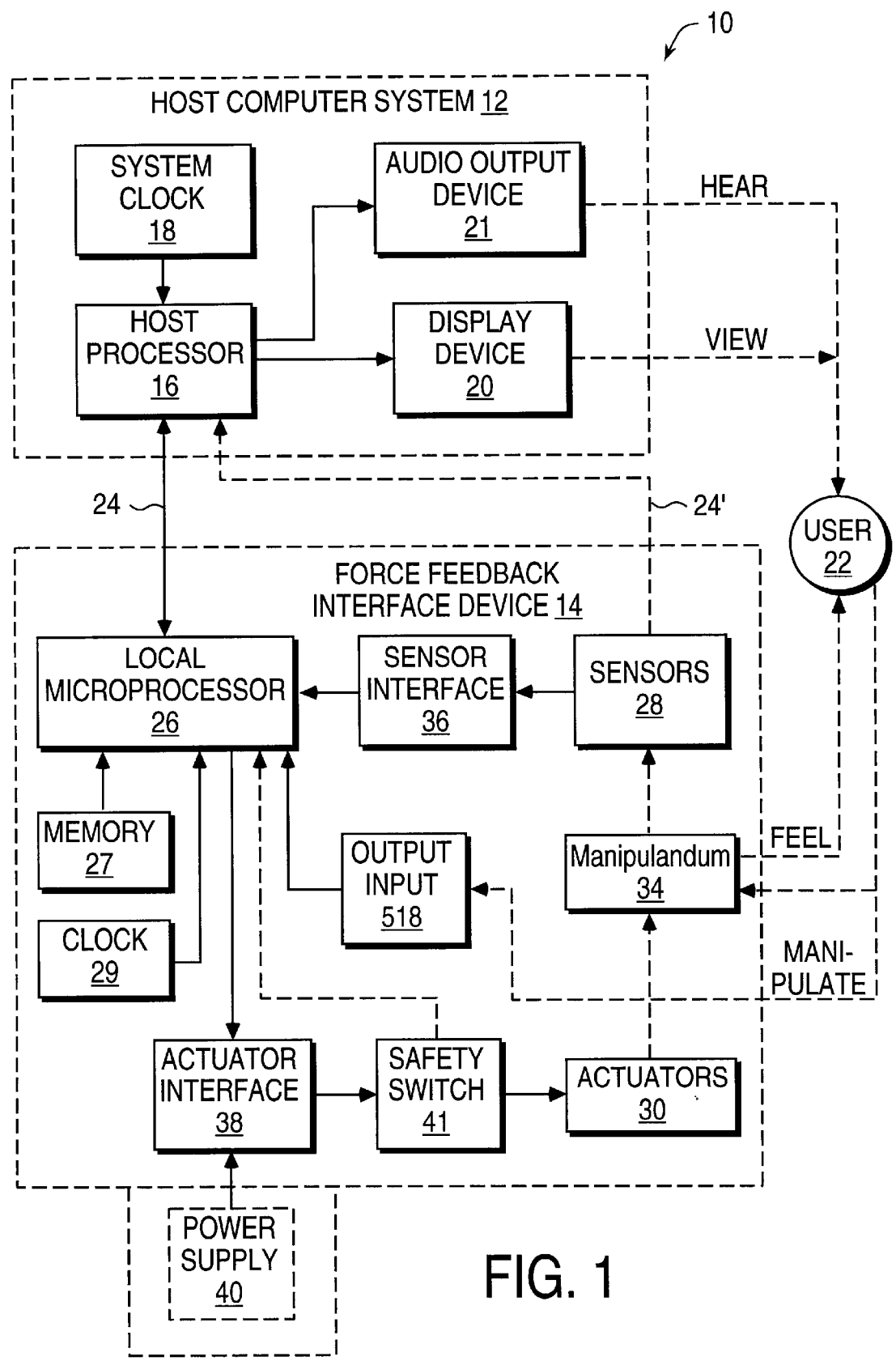
FIG. 1 is a block diagram illustrating an interface device and host computer suitable for use with the present invention.

FIG. 1 is a block diagram illustrating a force feedback interface system 10 for use with the present invention controlled by a host computer system. Interface system 10 includes a host computer system 12 and an interface device 14.

Host computer system 12 can be a personal computer, such as an IBM-compatible or Macintosh personal computer, or a workstation, such as a SUN or Silicon Graphics workstation. Alternatively, host computer system 12 can be one of a variety of home video game systems, such as systems available from Nintendo, Sega, or Sony, a television "set top box" or a "network computer", etc. Host computer system 12 preferably implements a host application program with which a user 22 is interacting via peripherals and interface device 14. For example, the host application program can be a video or computer game, medical simulation, scientific analysis program, operating system, graphical user interface, or other application program that utilizes force feedback. Typically, the host application provides images to be displayed on a display output device, as described below, and/or other feedback, such as auditory signals.

Host computer system 12 preferably includes a host microprocessor 16, a clock 18, a display screen 20, and an audio output device 21. Microprocessor 16 can be one or more of any of well-known microprocessors. Random access memory (RAM), read-only memory (ROM), and input/output (I/O) electronics are preferably also included in the host computer. Display screen 20 can be used to display images generated by host computer system 12 or other computer systems, and can be a standard display screen, CRT, flat-panel display, 3-D goggles, or any other visual interface. Audio output device 21, such as speakers, is preferably coupled to host microprocessor 16 via amplifiers, filters, and other circuitry well known to those skilled in the art (e.g. in a sound card) and provides sound output to user 22 from the host computer 12. Other types of peripherals can also be coupled to host processor 16, such as storage devices (hard disk drive, CD ROM/DVD-ROM drive, floppy disk drive, etc.), printers, and other input and output devices. Data for implementing the interfaces of the present invention can be stored on computer readable media such as memory (RAM or ROM), a hard disk, a CD-ROM or DVD-ROM, etc.

An interface device 14 is coupled to host computer system 12 by a bi-directional bus 24. The bi-directional bus sends signals in either direction between host computer system 12 and the interface device. An interface port of host computer system 12, such as an RS232 or Universal Serial Bus (USB) serial interface port, parallel port, game port, etc., connects bus 24 to host computer system 12. Alternatively, a wireless communication link can be used.

Interface device 14 includes a local microprocessor 26, sensors 28, actuators 30, a user object 34, optional sensor interface 36, an optional actuator interface 38, and other optional input devices 39. Local microprocessor 26 is coupled to bus 24 and is considered local to interface device 14 and is dedicated to force feedback and sensor I/O of interface device 14. Microprocessor 26 can be provided with software instructions to wait for commands or requests from computer host 12, decode the command or request, and handle/control input and output signals according to the command or request. In addition, processor 26 preferably operates independently of host computer 12 by reading sensor signals and calculating appropriate forces from those sensor signals, time signals, and stored or relayed instructions selected in accordance with a host command. Suitable microprocessors for use as local microprocessor 26 include the Immersion Touchsense Processor from Immersion Corp., the MC68HC711E9by Motorola, the PIC16C74 by Microchip, and the 82930AX by Intel Corp., for example. Microprocessor 26 can include one microprocessor chip, or multiple processors and/or co-processor chips, and/or digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer 12 provides high level supervisory commands to microprocessor 26 over bus 24, and microprocessor 26 manages low level force control loops to sensors and actuators in accordance with the high level commands and independently of the host computer 12. The force feedback system thus provides a host control loop of information and a local control loop of information in a distributed control system. This operation is described in greater detail in U.S. Pat. No. 5,734,373, incorporated herein by reference. Microprocessor 26 can also receive commands from any other input devices 39 included on interface apparatus 14, such as buttons, and provides appropriate signals to host computer 12 to indicate that the input information has been received and any information included in the input information. Local memory 27, such as RAM and/or ROM, is preferably coupled to microprocessor 26 in interface device 14 to store instructions for microprocessor 26 and store temporary and other data. In addition, a local clock 29 can be coupled to the microprocessor 26 to provide timing data.

Sensors 28 sense the position, motion, and/or other characteristics of a user object 34 of the interface device 14 along one or more degrees of freedom and provide signals to microprocessor 26 including information representative of those characteristics. Rotary or linear optical encoders, potentiometers, photodiode or photoresistor sensors, velocity sensors, acceleration sensors, strain gauge, or other types of sensors can be used. Sensors 28 provide an electrical signal to an optional sensor interface 36, which can be used to convert sensor signals to signals that can be interpreted by the microprocessor 26 and/or host computer system 12.

Actuators 30 transmit forces to manipulandum 34 of the interface device 14 in one or more directions along one or more degrees of freedom, and/or transmit forces to the housing or other portion of the device 14, in response to signals received from microprocessor 26. Actuators 30 can include two types: active actuators and passive actuators. Active actuators include linear current control motors, stepper motors, pneumatic/hydraulic active actuators, a torquer (motor with limited angular range), voice coil actuators, and other types of actuators that transmit a force to move an object. Passive actuators can also be used for actuators 30, such as magnetic particle brakes, friction brakes, or pneumatic/hydraulic passive actuators. Actuator interface 38 can be optionally connected between actuators 30 and microprocessor 26 to convert signals from microprocessor 26 into signals appropriate to drive actuators 30.

Other input devices 39 can optionally be included in interface device 14 and send input signals to microprocessor 26 or to host processor 16. Such input devices can include buttons, dials, switches, levers, or other mechanisms. For example, in embodiments where user object 34 is a joystick, other input devices can include one or more buttons provided, for example, on the joystick handle or base. Power supply 40 can optionally be coupled to actuator interface 38 and/or actuators 30 to provide electrical power. A safety switch 41 is optionally included in interface device 14 to provide a mechanism to deactivate actuators 30 for safety reasons.

Manipulandum ("user object") 34 is a physical object, device or article that may be grasped or otherwise contacted or controlled by a user and which is coupled to interface device 14. By "grasp", it is meant that users may releasably engage, contact, or grip a portion of the manipulandum in some fashion, such as by hand, with their fingertips, or even orally in the case of handicapped persons. The user 22 can manipulate and move the object along provided degrees of freedom to interface with the host application program the user is viewing on display screen 20. Manipulandum 34 can be a joystick, mouse, trackball, stylus (e.g. at the end of a linkage), steering wheel, sphere, medical instrument (laparoscope, catheter, etc.), pool cue (e.g. moving the cue through actuated rollers), hand grip, knob, button, or other object. Mechanisms which may be used to provide the degrees of freedom to the user object include gimbal mechanisms, slotted yoke mechanisms, flexure mechanisms, etc. Various embodiments of suitable mechanisms and actuator devices can be used, such as those described in U.S. Pat. Nos. 5,767,839, 5,721,566, 5,805,140, 5,825,308, and patent application Ser. Nos. 08/965,720, 09/058,259, 60/172,953, and 60/182,868, all incorporated herein by reference.

Actuator Control by Alternating Multiple Drive Signals

The designs discussed herein address several of the actuator control characteristics and problems described above and eliminate or reduce the undesirable effects the characteristics have on actuator output in the force feedback system 10.

The actuator interface 38 described herein includes a motor amplifier for each actuator 30 which is controlled by outputs from the local microprocessor 26 (or, alternatively, by host microprocessor 16). Each amplifier is controlled in ways described below to provide smoother zero crossover points and simpler, more cost effective linearization of actuator output.

Control Signals

The local microprocessor 26 (or host microprocessor 16 in a host control embodiment) is preferably provided with direct control over three signals for each motor amplifier. The three signals output by the microprocessor are PWMA, PWMB, and SELECT, which are input to a bridge circuit that interfaces the amplifier with these microprocessor signals. The signals have the following functions, with reference to the bridge circuit (see FIG. 3) that includes a motor and four switches (which are preferably drivers, e.g. transistors such as FETs) which allow current to pass through the motor in one direction or the other, depending on how the four switches are controlled. The use of switches to control current direction in amplifiers is well known to those skilled in the art.

| Signal | Function |
| --- | --- |
| PWMA | This controls the top left/bottom right switches in the bridge. When this signal is applied to the amplifier, current is driven in the "positive" direction. |
| PWMB | This controls the top right/bottom left switches in the bridge. When this signal is applied to the amplifier, current is driven in the "negative" direction. |
| SELECT | This signal is used to select which PWM signal is applied to the motor. It can have 3 different states: High, Low, and Tri-stated. |

Based on these three inputs, there are 2 output signals that are applied to the amplifier: DRIVEA and DRIVEB.

DRIVEA is asserted high to drive current in the positive direction and DRIVEB is asserted high to drive current in the negative direction. It is not valid for both of the DRIVEA and DRIVEB signals to be asserted simultaneously. These signals are the same as PWMA and PWMB, respectively, except that they are "gated" by the state of the select line. The logic is as follows:

| SELECT State | DRIVEA | DRIVEB |
|---|---|---|
| High | This signal is identical to the PWMA signal. | This signal is always low (inactive) for this condition. |
| Low | This signal is always low (inactive) for this condition. | This signal is identical to the PWMB signal |
| Tri-Stated (not driven) | This is high every other high period of PWMA and low otherwise | This is high every other high period of PWMB and low otherwise |

Control Circuit

Figure 2:
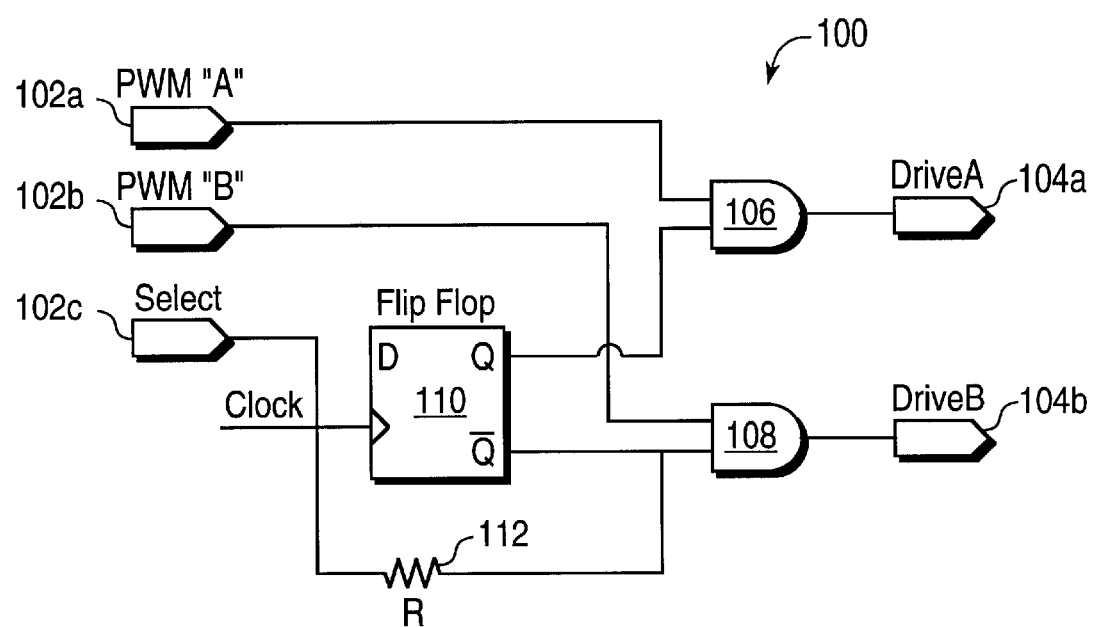
FIG. 2 is a schematic diagram of one embodiment of a selection circuit of the present invention.

FIG. 2 is a schematic diagram showing a suitable selection circuit 100 for implementing the present invention. The signals 102 are output by the controlling microprocessor, and the signals 104 are output to the bridge circuit switches.

The circuit of FIG. 2 functions by using the signals from the microprocessor (where the SELECT line can be high, low, or not driven, e.g. high impedance) and processing the signals using the two AND gates 106 and 108, the flip flop 110, and the resistor 112. When the SELECT line is high or low, the flip flop 110 outputs high or low signals, respectively, to enable the PWMA or PWMB signals. When the SELECT line is in the third state, the inverse Q output from the flip flop 110 drives through the resistor 112 to select the PWMA signal and the PWMB signal alternatively based on the clock signal input to the flip flop 110.

The circuit 100 can be duplicated twice in a force feedback device having two actuators, three times for three actuators, etc., where each actuator receives a dedicated set of DRIVEA and DRIVEB signals.

Figure 3:
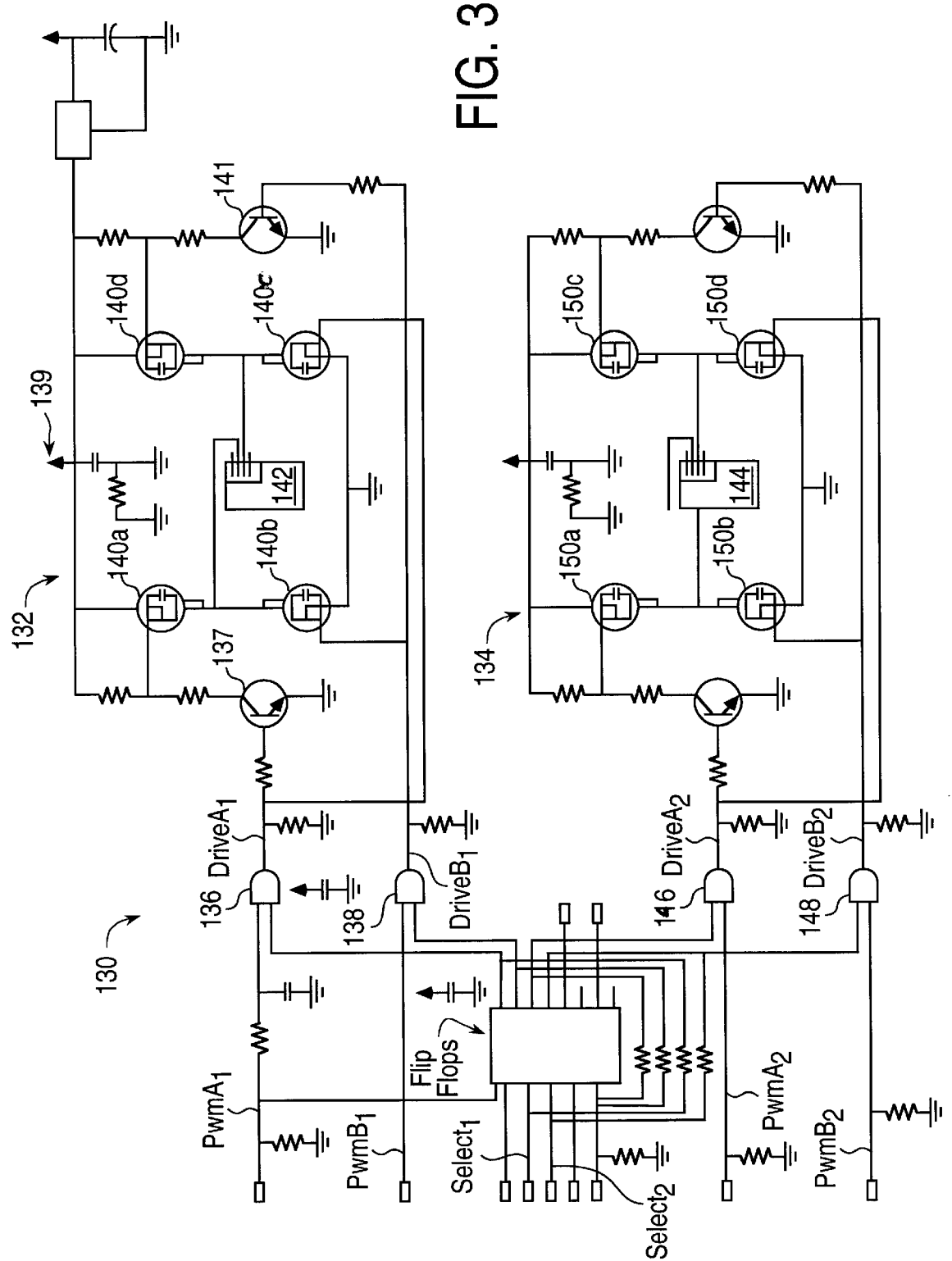
FIG. 3 is a schematic diagram of one embodiment of a circuit for the present invention including a selection circuit of FIG. 2 and bridge circuits for two actuators.

FIG. 3 is a schematic diagram of one example of a circuit 130 including the selection circuit 100 of FIG. 2 and a bridge circuit for each of two actuators included in a force feedback device. Bridge circuit 132 receives the DRIVEA1 and DRIVEB1 signals from the AND gates 136 and 138, which are equivalent to gates 106 and 108 of FIG. 2. The DRIVEA1 signal and drive transistor 137 and voltage supply 139 provide current to flow through the motor 142 in one direction and force to be output in a corresponding direction from the actuator; while this occurs, the DRIVEB1 signal is low. Switches 140a and 140c are closed to allow this current direction, while switches 140b and 140d are opened. Similarly, the DRIVEB1 signal, when high, and drive transistor 141 and voltage supply 139 cause current to flow and force to be output from motor 142 in the opposite directions as when the DRIVEA1 signal is high, and the DRIVEA1 signal is low. Switches 140b and 140d are closed in this case, while switches 140a and 140c are opened. Switches 140 are preferably transistors such as FETs, as shown.

Similarly, bridge circuit 134 provides the operating current for the second motor 144 from the incoming signals DRIVEA2 and DRIVEB2. These are separate signals from DRIVEA1 and DRIVEB1, derived from separate PWM signals; this allows each motor to be controlled independently. AND gates 146 and 148 operate similarly to gates 106 and 108 of FIG. 2, and switches 150a, 150b, 150c and 150d operate similarly to switches 140 as described above for bridge circuit 132.

Function

The force output through the zero current command crossing is desired to be as smooth and linear as possible to avoid or reduce any undesired "switching" forces which degrade the force sensations as experienced by the user of the force feedback device. To accomplish this smooth output, there are 2 regions or control provided in the present invention: the "crossover" region and the "single drive" region.

Figure 4:
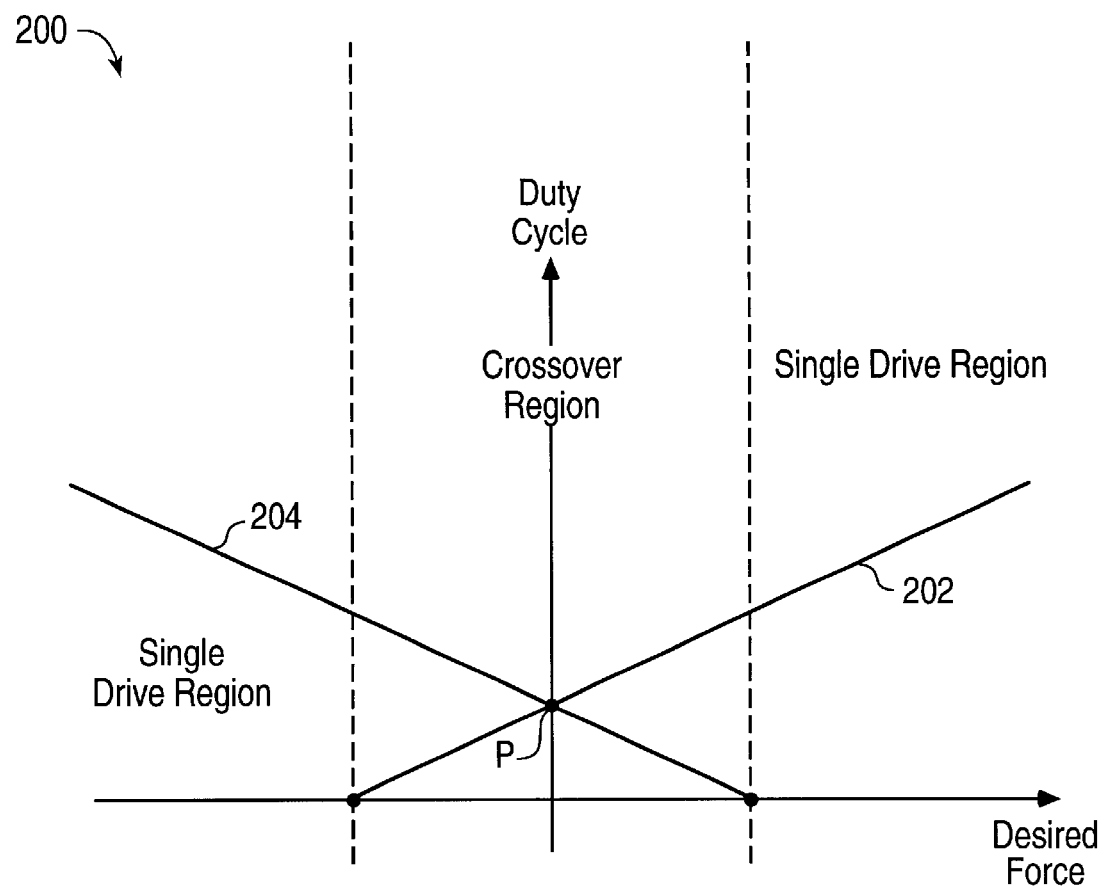
FIG. 4 is a graph illustrating an idealized actuator force response using the dual region control of the present invention based on duty cycle drive signal input.

FIG. 4 is a graph 200 illustrating the output curves 202 and 204 for an ideal actuator that provides an output force (and the current in the actuator) that is linearly based on input duty cycle. One curve 202 shows the DRIVEA signal applied to the actuator, and curve 204 shows the DRIVEB signal applied to the actuator. The single drive region is shown for PWMA at the right of the graph for positive-direction forces, where only the PWMA signal is applied as the DRIVEA signal. The signal drive region for PWMB is similarly shown at the left side of the graph for negative-direction forces. The crossover region is shown between the two single drive regions, where the DRIVEA and DRIVEB signals are both output as explained below (e.g. when the SELECT line is at tri-state). As the duty cycle for one of the signals is increased, the duty cycle for the other signal is decreased. At a point P, the duty cycles of the two signals are the same, thus providing an equal amount of force in both directions which cancel each other and effectively causing a zero output force as experienced by the user. The width of the crossover region is preferably large enough to provide a switching output over the region close to zero output force and a smooth output when switching from a single drive region to the crossover region, and vice versa.

In the crossover region, the process alternates the drive lines DRIVEA and DRIVEB applied to the bridge every PWM period. This is accomplished by maintaining a tri-state on the SELECT output. The goal is to gain better control of the current output for low current level and to achieve smoother transitions through the zero output force point. Because the direction of current drive is switched every cycle, a situation is created where the mean current output is at or near zero and can be smoothly adjusted in either direction.

In either "single drive" region, the amplifier is driven in the same manner as traditional switch mode amplifiers. Only one side of the bridge is active while the other side is held in an inactive state. This is accomplished by holding the select line either high or low, as provided in the table above. This causes either the PWMA signal or the PWMB signal to be applied, but not both PWM signals. The duty cycle of the single active drive signal is increased and decreased to adjust the actuator current and output force.

In contrast, in a traditional H bridge circuit design, there are two main methods that are used to control the bridge. The first method drives only one side of the bridge with current (e.g. one side of the bridge is active) at a time. The output magnitude is controlled by the duty cycle of a single controlling drive signal. To change directions of output force, the driven side of the bridge is switched using a direction signal, and the same controlling drive signal is output to the other side of the bridge. The result is that as the output force direction changes through zero, the amplifier transitions from commanding current only in one direction to commanding current in the opposite direction. This can generate significant discontinuities at the zero cross over point.

The second traditional method also provides both an amplitude signal and a direction signal; both sides of the bridge circuit are driven alternatively with the signal at all times and the output force is controlled by changing the duty cycle and sign of the direction signal. As one direction is favored by the duty cycle, the output of the actuator shifts to that direction, and vice-versa. The problem with this method is a weaker output force at the higher controlled levels; since the actuator is always being driven in both directions, the force in one direction is limited and maximum force output is less than the first method.

The present invention employs a different method. At low output levels (the crossover region), the direction driven is alternated on a cycle by cycle basis in order to achieve a smooth crossover through the zero output force, i.e. both sides of the bridge are balanced by alternating the drive direction each cycle. Each direction has a dedicated drive signal, where the controlling drive signals are alternatively switched. As the desired force becomes larger and passes the threshold between crossover region and single drive region, the output is switched such that only one direction is driven by one drive signal (single drive region). This allows for smooth control of the output current without any extra current (that would actually hurt the output drive) being used. By working both sides of the bridge against each other near zero in the design of the present invention, the current flip that normally exists in switch mode amplifiers is not present. Since the duty cycle for each PWM signal is halved in the crossover region, the duty cycle of each raw PWM signal is preferably doubled to achieve a drive PWM signal of the desired duty cycle and to match the output at the single drive region.

Figure 5:
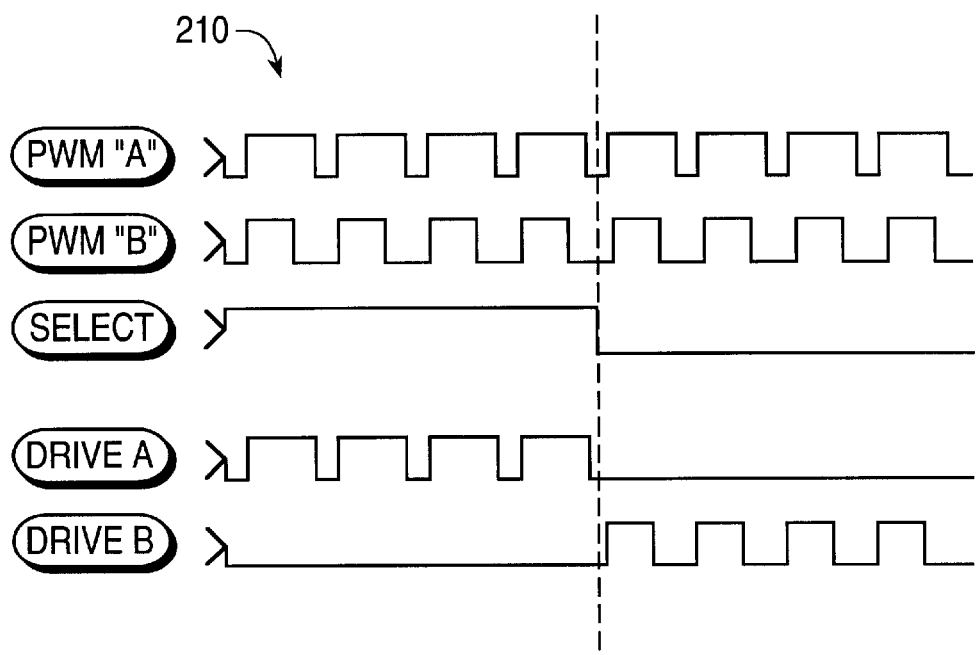
FIG. 5 is a state diagram showing the states for the drive and select signals for the single drive region of control of the present invention.

FIG. 5 is a diagrammatic illustration 210 of the signals described above as a voltage vs. time state diagram in which the SELECT line has either a high state or a low state. In these situations, only one side of the bridge circuit is being driven. Setting the select line either high or low is inhibiting the drive signal to the other side. This is the single drive mode in which the bridge is used most of the time when applying a force, except when the force output is desired to be near zero.

Before the time L, the SELECT signal has a high state, which causes the PWM A signal to be applied to the top left and bottom right switches in the bridge circuit. This causes the DRIVEA signal to be output as the PWM A signal, as shown, and drives current in the positive direction through the actuator to cause force output in the corresponding direction. After the dashed line, the SELECT signal has changed to a low state, which causes the PWM B signal to be applied to the top right and bottom left switches in the bridge circuit. This causes the DRIVEB signal to be output as the PWM B signal to drive current in the negative direction to cause force output in the direction opposite to the PWM A signal.

Figure 6:
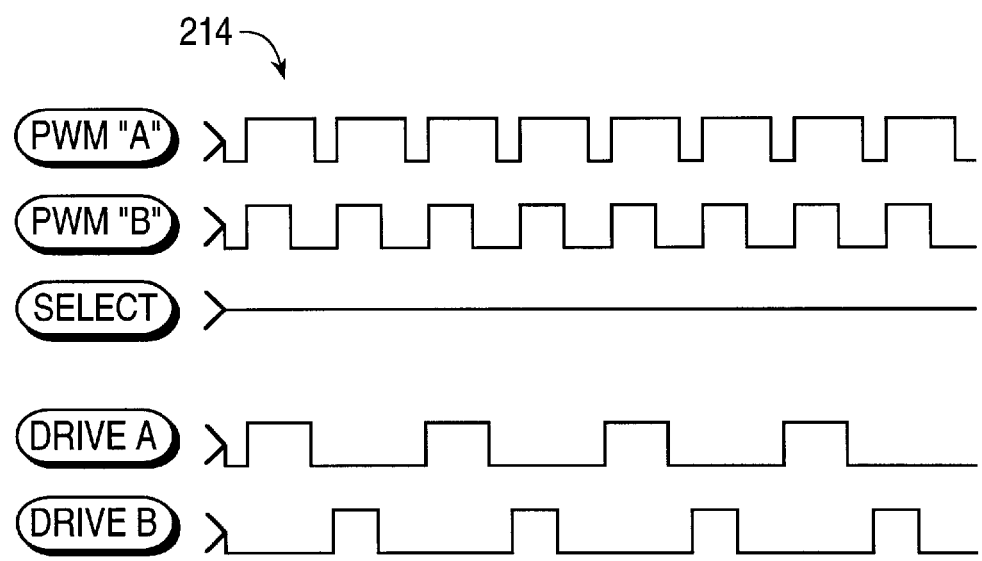
FIG. 6 is a state diagram showing the states for the drive and select signals for the crossover region of control of the present invention.

FIG. 6 is a diagrammatic illustration 214 of the signals in a voltage vs. time state diagram, where the SELECT signal is in a third state (tri-state). In this situation, the bridge is alternating sides that it is driving because the select line is tri-stated. When the select line is not driven (high impedance), Q' is applied to the D input of the flip flop. This causes the outputs of the flip flop to toggle every time a rising edge occurs on PWM A.

As shown, this causes the DRIVEA signal to be high every other high period of the PWM A signal and low in the periods between those high periods. This also causes the DRIVEB signal to be high every other high period of the PWM B signal and low in the periods between those high periods. The DRIVEA and DRIVEB signals are thus high in alternating periods, causing the motor to quickly switch directions in the crossover region and preventing any large switching force when output force direction is changed. Furthermore, there is some time provided between pulses on the DRIVE signals to allow the transistors to switch, providing more power efficiency.

Linearizing Actuator Output

Applying a simple pulse-width modulated output to an actuator drive circuit will not generally give very consistent results across the range of output force of the actuator. In many cases, the inductance of the actuator will keep the average motor current very low until the control duty cycle nears 50% on time, due to the time required to build voltage with the current. As the duty cycle rises above 50%, the curve describing drive duty cycle versus actuator current rises abruptly and is still not very linear overall. However, different sections of the curve are relatively linear.

The present invention characterizes the linearity of the different sections of the curve for a specific actuator and then uses the piecewise linear approximation to generate an actuator command from a desired actuator current, i.e., the piecewise linearization is performed on an output characterization of an actuator to cause the output current through the actuator to be linear with respect to the computed command. First, actuator torque for a specific actuator is characterized in order to know an approximation of torque output by the actuator when commands of different duty cycles are input. During operation, the piecewise linearization adjusts the command output to account for the nonlinearity between the command duty cycle and the output current. By modeling actuator performance beforehand, there is no need to measure current in the actuator during run time to adjust the duty cycle in a closed-loop fashion. For example, in many existing actuators, current in the actuator (or output force, which is generally equivalent) is measured during run time and fed back to the microprocessor or other control circuit in a closed loop so that the PWM output may be adjusted to produce the desired current and output force. This allows the nonlinearity of the actuator to be compensated for, but requires expensive components. The characterization of the present invention allows an open loop system to be used, which does not require the more expensive components of the closed loop system.

In both the crossover region and the single drive region, the piecewise linearization is preferably executed for the desired output force. This linearization is performed open loop based on an actuator model or characterization that is generated in a test situation previous to actual run time. In other words, the force output of the actuator (or current driven in the actuator) is examined and recorded at different command duty cycles and then, based on the recorded force (or current) data, individual sections of the response plot are modeled that are approximately linear. Then, at run time, the desired actuator force is correlated to a linear section of the command curve to determine the required command duty cycle.

Figure 7A:
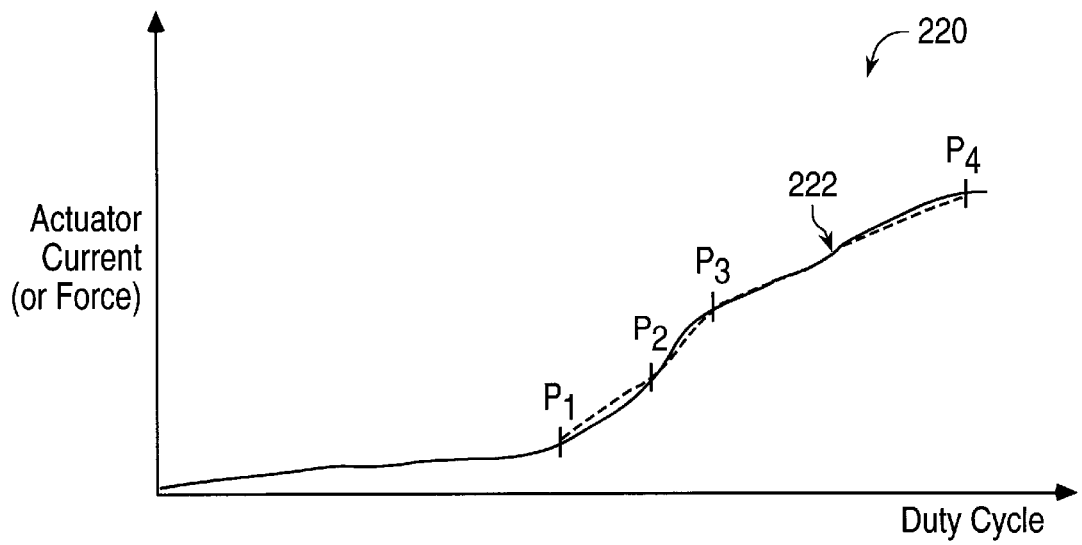
FIG. 7a is a graph illustrating a typical nonlinear relationship between duty cycle and actuator current.

For example, FIG. 7a shows a graph 220 that illustrates the relationship between actual current in an actuator (vertical scale), which is proportional to the force output of the actuator, and the input of different PWM duty cycles (horizontal scale). The response curve 222 is nonlinear, so that the output actuator force cannot be simply assumed based on a linear or other simple relationship with input duty cycle. For example, for most of the lower half of duty cycles (up to point P1), very small actuator current and output force results from the input duty cycle, and there is little increase in current and output when duty cycle is increased. After point P1, however, the current and force output increases much more rapidly with an increase in duty cycle. But even above point PI the curve varies greatly from a linear path.

Multiple sections of the curve 222, however, are approximately linear. For example, the sections between the designated points P1 and P2, between points P2 and P3, and between points P3 and P4 on the curve can be approximated as straight lines. A piecewise linearization can be provided, where the designated points P1–P4 are stored in a table in memory, magnetic disk, or other computer-readable storage medium, and where desired points between or outside two successive ones of the points P1–P4 can be approximated using a linear formula.

Figure 7B:
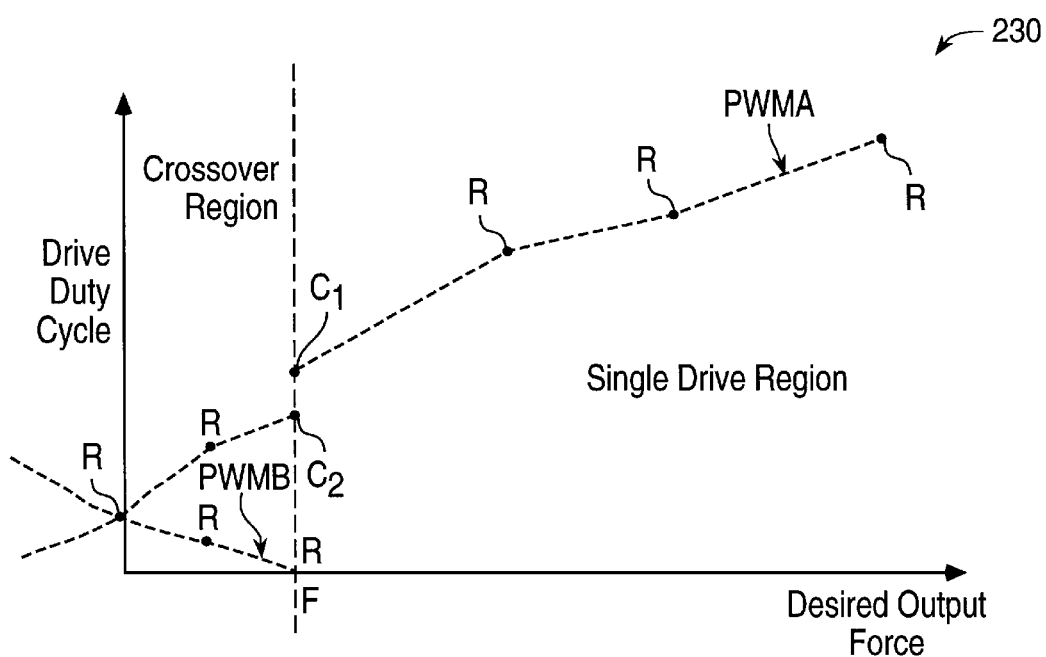
FIG. 7b is a graph illustrating a linearization of the present invention of a curve based on a nonlinear response of an actuator to duty cycle.

FIG. 7b shows a graph 230 that illustrates the linearization of a curve based on a nonlinear response of an actuator to duty cycle. The vertical scale is the commanded drive duty cycle (seen at the actuator) and the horizontal scale is the desired output force of the actuator. The curve PWMA indicates the drive duty cycle of the PWMA signal at different desired output force magnitudes. The points R on the curve are actual points from the nonlinear response of the actuator as determined from the pre-characterization of the actuator shown in FIG. 7a. The points between the points R have been linearly approximated. Thus, if a particular output force of the actuator is desired, a linear approximation determines what approximate duty cycle must be commanded to achieve that force output.

The piecewise approximation of the present invention is preferably used in conjunction with the crossover region and single drive region of the present invention as described above. FIG. 7b illustrates the crossover region and the single drive region. A portion of the crossover region is shown between the 0 force level and a threshold force F. In the crossover region, the PWMA curve is shown as well as a portion of a PWMB curve, similar to the crossover region of the ideal actuator shown in FIG. 4, where both of the PWM signals alternate outputs. In this crossover region, a direct linear approximation of the curve of FIG. 7a is not as straightforward due to the presence of two curves. Thus, the PWMA and PWMB approximated curve points R and C2 in the crossover region can be empirically determined by trial and error, e.g. determining duty cycles that provide a smooth transition from the single drive region curve; or by using a two-dimensional surface plot with two variables.

The PWMA curve steps up at the threshold force F where the SELECT line goes from the tri-state to a high state. Point C1 is part of the single drive region curve while point C2 is part of the crossover region curve. This step is intentionally included in the linear approximation curve to compensate for the inductance in the actuator. Since the signal has a lower frequency in the crossover region, more current is provided for the same duty cycle; therefore, to compensate for this, the duty cycle is lowered. Point C2 is preferably determined based on matching the current at C2 with the current at point C1 to provide a smooth mode change.

The graph is preferably identical on the left half of the 0 force axis, except that the PWMB signal increases the further one moves from the 0 axis (and includes a similar step as between points C1 and C2) and the PWMA signal goes to zero at a threshold of approximately—F, similarly to the ideal graph shown in FIG. 4.

Preferably, a lookup table describing the PWMA and PWMB duty cycle curves is stored in memory or other storage medium, such as the local memory on the force feedback device accessible by the local microprocessor. The lookup table stores the desired force for each point R and the corresponding duty cycle for each point R for both the PWMA curve and the PWMB curve. Both points C1 and C2 are also stored in the table, with their corresponding PWMA and PWMB duty cycles. For the desired force values in the single drive region, one of the associated PWM curve values in the table will be zero, since only one PWM signal is asserted in that region. For example, all PWMB duty cycle values in the table are zero for desired force values above the threshold force F. Only one half of the entire force range, e.g. only the positive range as shown in FIG. 7b, need be stored, since the curve in the other half of the range is preferably identical and can be determined quickly from the existing stored points. For example, for the negative portion of the graph, the PWMA duty cycle values are zero instead of the PWMB values.

Figure 8:
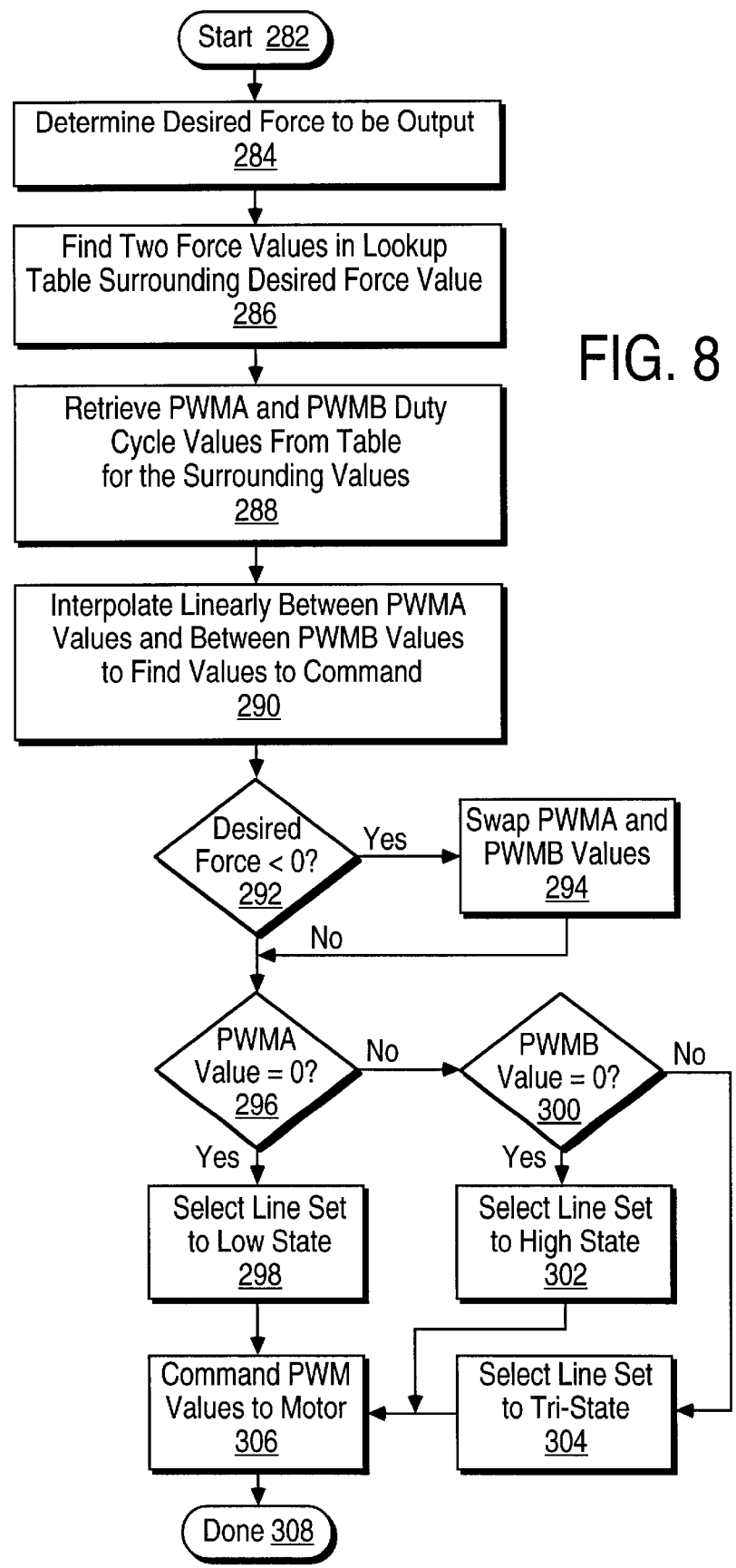
FIG. 8 is a flow diagram illustrating a method of the present invention for controlling the drive signals to provide a linear and smooth actuator force output.

FIG. 8 is a flow diagram illustrating a method 280 for determining the PWMA and PWMB values and the SELECT line state using a linearized look-up table as described above. The process starts at 282 during run time, when forces are to be output. In step 284, a microprocessor or other controller determines the desired force to be output from the actuator. This can be determined from a received host command or value, a local routine or algorithm, or other process. For example, if two displayed objects collide in a graphical environment, a desired force that haptically portrays the collision to the user is calculated Abased on predetermined relationships, characteristics of the objects, and other factors. In step 286, the microprocessor finds the two force values in the lookup table that surround the desired force, i.e. the two values between which the desired force would be situated in the table. Preferably, the absolute value of the desired force is used, since only the positive (or negative) range of forces need be stored in the table, as explained above. In step 288, the PWMA and PWMB duty cycle values in the table associated with those surrounding force values are retrieved. In step 290, the process interpolates linearly between the PWMA values to find an interpolated PWMA value, and similarly interpolates linearly between the PWMB values to find an interpolated PWMB value. These interpolated PWMA and PWMB values are the resulting linearly-approximated values of the duty cycle for each signal.

To determine the state of the SELECT line, the process performs the following steps starting at step 292. If the desired force (from step 284) is less than zero, indicating it is the opposite direction than positive force values, i.e. the negative range of the graph is being used. If so, then in step 294 the interpolated values for PWMA and PWMB are swapped. After step 294, or if the desired force is 0 or greater, step 296 is initiated, in which the process checks if the interpolated PWMA value is equal to zero. If so, this indicates that the single drive region in the negative range of the graph is being used, and that the PWMB signal is used to command the motor, i.e., the B switches in the bridge circuit should be driven. Thus, the SELECT line is set to a low state in step 298 to allow the PWMB signal to command the actuator. If the interpolated PWMA value is not zero, then in step 300 the process checks if the PWMB signal is equal to zero. If so, the single drive region in the positive range of the graph is being used, and the PWMA signal is used to command the motor, i.e., the A switches in the bridge circuit should be driven. Thus, the SELECT line is set to a high state in step 302 to allow the PWMA signal to command the actuator. If in step 300 the PWMB value is not equal to zero, then both the PWMA and PWMB duty cycles are nonzero, and the crossover region is active. Thus, the SELECT line is set to the tri-state in step 304. After any of steps 298, 302, and 304, the interpolated PWM duty cycles are used to output appropriate PWM signals to the appropriate hardware to drive the actuator in step 306 with the appropriate SELECT state set, and the process is complete at 308. The process is repeated when another force is to be output by the actuator. A microprocessor or other circuitry can perform part or all of the above method. If additional actuators are used, e.g. to provide forces in other degrees of freedom as in a joystick with two degrees of freedom, then the process can be duplicated for each additional actuator.

The above method is particularly useful for lower-cost devices in which back EMF is not a significant problem (see below). For example, some force feedback devices may provide vibrotactile forces on the housing of the device, where the user does not move the actuator shaft when moving the manipulandum. Some examples of such a device are gamepads or mice including a rotating eccentric motor or linear vibrotactile motor that produces vibrations on the housing of the device. In such a device, the shaft of the motor is not moved by the user and back EMF forces are therefore not produced, allowing the linearization described above to be fairly accurate when predicting actuator output.

It should be noted that the linearization method described above can be used with other actuator control circuits as well. For example, in some force feedback device, the actuators may not be driven using PWM signals but may still provide a nonlinear output force in relation to the input current or voltage. The output force curve for such an actuator can be analyzed similarly as above to determine points between which the curve is approximately linear. At run time, a look-up table can be provided to linearize the output in open-loop fashion, similarly to the PWM linearization described above.

Other Methods for Linearizing Actuator Output

Other techniques may also be used to improve the linearization of actuator output instead of or in addition to the methods described above. The above-described methods do not account for power supply variation, temperature variation, or the back EMF that is generated by user motion. To varying degrees, these effects can be compensated for if the effects are either measured or modeled by the microprocessor or other control circuit. Some techniques of the present invention for compensating for these effects are described below.

Power Supply Compensation

Variation in the voltage level of the actuator power supply is not typically monitored in existing force feedback devices. If a well-regulated power supply is used that, for example, does not vary power significantly with load and/or has a low ripple current specification, variation in the power supply may not be an issue. In other implementations, however, power supply voltage may vary to a greater extent. Because the actuator current varies nearly linearly with the supply voltage (assuming a constant duty cycle command to a switch mode amplifier), variations in supply voltage can cause undesirable variations in actuator current and thus in output force. The supply voltage level can be measured with an A/D converter in the actuator interface circuit and then the command output can be updated to a desired level to accommodate any variation in the supply level.

Velocity/Back EMF Compensation

In force feedback device embodiments having DC motors connected through a gear ratio to the manipulandum (e.g. a transmission system such as a belt drive, gear drive, or capstan drive), the motor velocities can become very large when the manipulandum is moved by the user. This results in a situation where the motor current (and thus the motor output force) will vary significantly as the manipulandum is moved in different directions and at different speeds due to the back EMF effect. Since the velocity of the manipulandum is typically already being measured in a force feedback device (e.g., to determine velocity-dependent forces such as damping forces), this sensed velocity information can also be used to predict the change in motor current caused by the motion of the manipulandum by the user, and then compensate for the predicted change in current in the command that is applied to the motor amplifier. For example, in one embodiment, different velocities of the manipulandum can be mapped to different changes in motor current and different compensation values which alter the PWM signals to compensate for the EMF effect. These relationships can be stored as a look-up table or can be reduced to one or more formulas if possible. The direction of the manipulandum can also be taken into account if the direction alters the motor current. The manipulandum velocity is then sensed during operation of the device and the corresponding compensation value (or PWM value) is determined to provide a more linear actuator output.

Temperature Modeling/Measurement

As higher current is driven through an actuator, the coil winding in the actuator will begin to heat up. The change in temperature changes the impedance of the coil and affects the current that is flowing through it. Coil temperature can be measured with a temperature sensor (or other sensor that measures an actuator characteristic proportional to temperature), or the coil temperature can be modeled using preexisting models based on commanded current to approximate the current coil temperature. The temperature information or estimate can be used with a model of impedance variation with temperature to adjust the command output to get the desired current and output force. For example, the model of impedance variation can be obtained by precharacterizing the impedance of the actuator before run time.

While this invention has been described in terms of several preferred embodiments, it is contemplated that alterations, permutations and equivalents thereof will become apparent to those skilled in the art upon a reading of the specification and study of the drawings. Furthermore, certain terminology has been used for the purposes of descriptive clarity, and not to limit the present invention.

What is claimed is:

1. A circuit and method for commanding a desired force from an actuator provided in a force feedback device, the method comprising providing two drive signals, each of said drive signals operative to cause current to flow in a different direction in said actuator, thereby causing force to be output by the actuator in two different corresponding directions; when a desired force to be output is below said predetermined threshold force, alternating between said two drive signals for each period of said drive signals to cause a corresponding current in the actuator, thereby switching said direction of said desired force for each of said periods; when said desired force is above said predetermined threshold force, using only one of said drive signals to cause current in said actuator in one direction and said desired force to be output in one direction; and wherein said drive signal are PWM (PULSE-WIDTH MODULATOR) drive signals.

2. A method as recited in claim 1 wherein a select signal is provided to select between using said two PWM drive signals and using only one of said PWM drive signals.

3. A method as recited in claim 2 wherein said select signal has three states, such that a first of said states causes only a first of said PWM drive signals to be used, a second of said states causes only a second of said PWM drive signals to be used, and a third of said states causes said alternating between said first and second PWM drive signals.

4. A method as recited in claim 1 wherein each of said PWM drive signals controls two switches in an actuator bridge circuit.

5. A method as recited in claim 4 wherein said select signal is passed through a flip flop and through a resistor in parallel with said flip flop, wherein an output of said flip flop is used to select whether said first PWM signal is provided to said actuator, and wherein an inverted output of said flip flop is used to select whether said second PWM signal is provided to said actuator.

6. A method as recited in claim 1 further comprising correlating said desired force to be output by said actuator with an approximated linear section of a characterization curve of drive signal duty cycles for said actuator to determine a required duty cycle for said drive signals.

7. A method as recited in claim 6 wherein said characterization curve includes a plurality of points obtained from a characterization performed before run time of said actuator.

8. A circuit for commanding a desired force from an actuator provided in a force feedback device, the circuit comprising:
    a selection circuit receiving two drive signals, said selection circuit selecting one of said drive signals or selecting both of said drive signals to be output from said selection circuit, wherein only one of said drive signals is selected when a desired force to be output by said actuator is above a predetermined threshold force, and wherein both of said drive signals are selected when said desired force is between said threshold force and zero such that said two drive signals are output by alternating each drive signal for each period of said drive signals; and
    a bridge circuit coupled between said selection circuit and said actuator and receiving said drive signal selected by said selection circuit, wherein said bridge circuit provides a current to flow in said actuator corresponding to said drive signal, thereby causing a force to be output by said actuator in a corresponding direction, wherein if said bridge circuit receives said one selected drive signal, said force is output in one direction, and wherein if said bridge circuit receives said alternating drive signals, said direction of said desired force is switched for each of said periods of said drive signals.

9. A circuit as recited in claim 8 wherein said drive signals are PWM drive signals.

10. A circuit as recited in claim 9 wherein a select signal is provided to select between using said two PWM drive signals and using only one of said PWM drive signals.

11. A circuit as recited in claim 10 wherein said select signal has three states, such that a first of said states causes only a first of said PWM drive signals to be used, a second of said states causes only a second of said PWM drive signals to be used, and a third of said states causes said alternating between said first and second PWM drive signals.

12. A circuit as recited in claim 9 wherein said bridge circuit includes four switches, and wherein each of said PWM drive signals controls two of said switches.

13. A circuit as recited in claim 12 wherein said selection circuit includes a flip flop and a resistor in parallel with said flip flop, wherein an output of said flip flop is used to select whether said first PWM signal is provided to said bridge circuit, and wherein an inverted output of said flip flop is used to select whether said second PWM signal is provided to said bridge circuit.

14. A circuit as recited in claim 8 further comprising a memory storing a look-up table of PWM duty cycle values, said look-up table correlating said desired force to be output by said actuator with an approximated linear section of a characterization curve of drive signal duty cycles for said actuator to determine a required duty cycle for said drive signals.

15. A method for controlling an actuator to compensate for a nonlinear output of said actuator, the method comprising:
    determining a desired command current for an actuator, said command current causing a desired output force to be output by said actuator; and
    correlating said desired command current with an approximated point of a characterization curve of said actuator, said characterization curve including a plurality of points determined in a previously performed characterization of said actuator, wherein said approximated point is determined between two successive points of said plurality of points using a linear approximation, and wherein a required command duty cycle is determined from said approximated point of said characterization curve, wherein a drive signal having said determined command duty cycle is applied to said actuator to cause said actuator to output said desired force.

16. A method as recited in claim 15 wherein said plurality of points of said characterization curve are stored in a look-up table.

17. A method as recited in claim 15 wherein said plurality of points includes at least three points to provide at least two linear sections of said curve.

18. A method as recited in claim 15 wherein said drive signal is a first drive signal, and wherein a second drive signal is also output to drive said actuator when said desired output force is between zero and a threshold force.

19. A method as recited in claim 18 wherein when said first and second drive signals are both output, said first and second drive signals are alternated at each period of said drive signals to provide a switching current in said actuator and a switching output force.

20. A method as recited in claim 18 wherein a linearly-approximated duty cycle is obtained for both of said drive signals.

21. A method as recited in claim 18 wherein said characterization curve includes a step at said threshold force.

22. A method as recited in claim 15 further comprising compensating for voltage variations supplied to said actuator from a power supply such that said actuator output is linear regardless of said variations.

23. A method as recited in claim 15 wherein said actuator is provided in a force feedback device that also includes a manipulandum moved by a user, wherein said actuator outputs said force on said manipulandum, and further comprising:
    predicting a change in actuator current caused by a back EMF effect induced by motion of said manipulandum by said user, said predicted change in motor current based on a determined velocity of said manipulandum; and
    compensating said drive signal to said actuator in accordance with said predicted change in current so as to reduce nonlinear output of said actuator caused by said back EMF effect.

24. A method as recited in claim 15 further comprising receiving temperature information indicating a temperature of a coil winding of said actuator, and adjusting said drive signal based on said temperature information to compensate for a change in current in said actuator caused by a temperature variation in said coil winding and to cause said desired force to be output.

25. A circuit for providing force feedback from an activator, wherein the force applied to the actuator is variable through a range of forces including a first range of forces comprising forces in a first direction and a second range of forces comprising forces in a second direction opposite the first direction and a third range of forces between the first and second ranges of forces, the circuit comprising:

a selection circuit for selecting a first drive signal when a force in the first range of forces is desired and a second drive signal when a force in the second range of forces is desired; and an alternator for alternating between the first drive signal and the second drive signal when a force in the third range of forces is desired.

26. The circuit of claim 25, wherein the first drive signal generation circuit and the second drive signal generation circuit are configured such that a duty cycle of the second drive signal is not strictly determined by a duty cycle of the first drive signal and the duty cycle of the first drive signal is not strictly determined by the duty cycle of the second drive signal.

27. The circuit of claim 25, further comprising a first drive signal generation circuit that generates a PWM signal for the first drive signal and a second drive signal generation circuit that generates a PWM signal for the second drive signal.

28. The circuit of claim 27, wherein the first drive signal generation circuit and the second drive signal generation circuit are configured such that a duty cycle of the second drive signal is not strictly determined by a duty cycle of the first drive signal and the duty cycle of the first drive signal is not strictly determined by the duty cycle of the second drive signal.

29. The circuit of claim 27, wherein the alternator alternates between the first drive signal and the second drive signal each cycle of a PWM clock.

30. The circuit of claim 25, wherein the first and second forces are along one degree of freedom, the circuit further comprising circuitry for providing force feedback in a second degree of freedom.

31. The circuit of claim 25, wherein the third range is defined by a threshold such that forces below the threshold in the first direction form one boundary of the third range and forces below the threshold in the second direction form the other boundary of the third range.

32. The circuit of claim 25, further comprising a signal transfer circuit for each of the first drive signal and the second drive signal, wherein the signal transfer circuit includes an input indicating a desired force to be applied and is configured to generate a drive signal from the input such that the drive signal results in at least approximately the desired force.

33. The circuit of claim 32, wherein the signal transfer circuit includes linearization means for translating the input to the drive signal such that the resulting force is approximately linearly related to the input.

34. The circuit of claim 33, wherein linearization means is a lookup table containing correspondences between input values and drive signal values.

35. The circuit of claim 34, wherein the correspondences are correspondences measured from prior application of input signals to determine the corresponding force output for each input signal.

36. A circuit for providing force feedback from an activator, wherein the desired force applied to the actuator is variable through a range of forces including forces in one direction for a degree of freedom, forces in an opposite direction from the one direction and a zero net force for the degree of freedom, the circuit comprising:

a first drive signal generator for generating a drive signal to impart a force in the one direction;

a second drive signal generator for generating a drive signal to impart a force in the opposite direction; and drive signal selection logic for enabling force application based on the first drive signal generator when the desired force is in the one direction and greater than a first threshold in the one direction, enabling force application based on the second drive signal generator when the desired force is in the opposite direction and greater than a second threshold in the opposite direction, and enabling force application based on both the first drive signal generator and the second drive signal generator when the desired force is between the first threshold and the second threshold.

37. The circuit of claim 36, wherein the first threshold and the second threshold are equal and opposite.

38. The circuit of claim 36, wherein drive signal selection logic alternates between applying the first drive signal and the second drive signal.

* * * * *

UNITED STATES PATENT AND TRADEMARK OFFICE
CERTIFICATE OF CORRECTION

PATENT NO. : 6,762,745 B1
DATED : July 13, 2004
INVENTOR(S) : Braun et al.

It is certified that error appears in the above-identified patent and that said Letters Patent is hereby corrected as shown below:

Column 14,
Line 47, the words "A circuit and method for" should read -- A method for --
Lines 52 and 56, the words " the actuator" should read -- said actuator --
Line 56, the words "switching said" should read -- switching the --
Line 61, the word "signal" should read -- signals --

Signed and Sealed this

Seventh Day of September, 2004

JON W. DUDAS
*Director of the United States Patent and Trademark Office*